United States Patent [19]

Grauel et al.

[11] Patent Number: 4,815,073
[45] Date of Patent: Mar. 21, 1989

[54] ACCESSING OF TRANSMISSION CHANNELS OF A COMMUNICATION SYSTEM

[75] Inventors: Christoph Grauel, Feucht; Werner Schmidt, Heroldsberg, both of Fed. Rep. of Germany

[73] Assignee: Philips Kommunikations Industrie AG, Nuremberg, Fed. Rep. of Germany

[21] Appl. No.: 885,764

[22] Filed: Jul. 15, 1986

Related U.S. Application Data

[63] Continuation-in-part of Ser. No. 407,691, Aug. 12, 1982.

[30] Foreign Application Priority Data

Aug. 22, 1981 [DE] Fed. Rep. of Germany ....... 3133347

[51] Int. Cl.[4] .............................................. H04J 3/16
[52] U.S. Cl. ....................................... 370/95; 455/33; 379/60
[58] Field of Search ...................... 455/33; 379/59, 60; 370/94, 95

[56] References Cited

U.S. PATENT DOCUMENTS

| 3,458,664 | 7/1969 | Adlhoch et al. | |
| 4,398,063 | 8/1983 | Hass et al. | 370/95 |
| 4,475,010 | 10/1984 | Huensch et al. | 370/94 |

Primary Examiner—Douglas W. Olms
Assistant Examiner—Wellington Chin
Attorney, Agent, or Firm—Horst M. Kasper

[57] ABSTRACT

In a communications system with a plurality of subscriber stations independent of each other, where each subscriber station can access a joint duplex transmission channel according to a multiple access method, the probability of simultaneous attempts to get access becomes very image, and thereby the probability of signal destruction is particularly increased. In order to avoid a blockage of the service channel each subscriber station occupies the duplex transmission channel with a short access signal for initiating a transmission starting from the subscriber station. The subscriber station characterized by the position in time and/or the information contents of the short access signal is thereupon invited by the central base station to emit an access signal to join practical access to the communication exchange.

20 Claims, 4 Drawing Sheets

ACCESSING OF TRANSMISSION CHANNELS OF A COMMUNICATION SYSTEM

CROSS-REFERENCE TO RELATED APPLICATIONS

This application is a continuation-in-part application of another application filed Aug. 12, 1982 and bearing Ser. No. 407,691. The entire disclosure of this latter application, including the drawings thereof, is hereby incorporated in this application as if fully set forth herein.

BACKGROUND OF THE INVENTION

1. Field of the Invention

The present invention relates to a method and to a system for accessing of transmission channels of a communication system with at least a central base station, with at least a duplex transmission channel and with a plurality of subscriber stations independent of each other, where each subscriber station can have access to the duplex transmission channel according to a multiple access method.

2. Brief Description of the Background of the Invention Including Prior Art

A system for transmission of messages via radio communication can be recited as an example for such a communication system. A radio transmission system is known from German Patent Application Laid Open DE-OS No. 2,537,683 having stationary radio stations and mobile subscriber stations. There, to each stationary radio station (central base station) is assigned a set of duplex transmission channels. One of the channels, the control channel, is employed for the transmission of control information for a system of operations and the other channels (the voice channels) are employed for voice communication. In the following, the transmission direction from the subscriber station to the central base station is called forward direction and the reverse transmission direction is called backward direction. The principles of operation of various channel access methods are taught in German Patent Application Laid Open DE-OS No. 2,537,683.

An identification of a subscriber station can be for example, a calling number which is in correspondence to a telephone number. For example, the local central office can assign a number to the subscriber. Then a city code can be assigned to the local station. Further, an area code can be provided for the area in which the local station is disposed. In addition, the area can be located in a certain country, and a country code can be provided for this purpose. In addition, the identification assigned can comprise a certain signal identifying the type of service to which this station and network belongs. It can be recognized that there are a variety of options in characterizing stations and subscribers.

An access cell information is shorter than a complete identification and comprises a signal which has less than 80 percent of the number of character units of a comparable identification signal set forth above for the type of service common in that area. Preferably, an access signal does not employ more than 50 percent of the characterizing units required for a full identification of a subscriber station. It is particularly advantageous when the access signal does not cover more than 30 percent of the transmission characterizing units required for a full identification information of that station. For example, an access signal can comprise from about 2 to 10 and preferably from about 3 to 5 character units employed for this type of information transmission. A character unit can be for example on octal number, a hexadecimal number, a character of an international telegraph alphabet, an ASCII character, a byte, a memory word or the like.

At the start of each transmission from a mobile subscriber station to a conventional central base station, initially as identification of the mobile subscriber station is transmitted in the forward direction via the control channel (duplex transmission channel). If two or more subscriber stations emit their identification at the same time onto the control channel, then none of these identifications can be recognized in the central base station except for the special case, where one of the identifications is received with a substantially larger power than from all the others.

Also, with an increasing number of subscriber stations, the probability increase that more than one of the subscriber stations intend to access the control channel at the same time. Since the control channel is to be used by all subscriber stations jointly, the probability for access attempts to the control channel at the same time and therewith the probability of destruction of the signals are particularly large.

A further increase in the probability of destruction results from the repetition of attempts of accessing based on identifications which are not recognized. With each destruction of an access, the transmission channel is not useable for at least the duration of an identification, that means, it is blocked. The portion of time the control channel is blocked due to access destructions increases additionally with the length of the identification, that is, with the number of the subscriber stations to be admitted to the complete communications system.

In case of short and frequent transmissions the capacity of the duplex transmission channel can only be utilized in small part.

Joel, Jr. teaches in U.S. Pat. No. 3,663,762, a mobile communication system which incorporates an electronic processor. The system comprises a plurality of base stations each located in individual cell areas. Predetermined cell areas are periodically interrogated to detect movement of located mobile stations into new areas.

Wells et al. in U.S. Pat. No. 3,898,390 teach a mobile radio communication system and a method for increasing the effective use of communication channels in a small zone communication system. Calls between two mobile units may be routed through a central control terminal and base stations. The mobile units may all search for and lock onto an appropriate control signal channel. A call is initiated over a base station control signal channel and the control and signalling link connecting the base station to the control terminal. An available voice channel assigned to the base station through which the cell is established is then assigned to the cell. In the event that the cell was originated by a mobile unit and a cell back is requested, the central processing unit may store the cell until circuits are clear and then notify the mobile unit of the availability of circuits at a later time (column 7, lines 59 to 63).

U.S. Pat. No. 3,590,166 and U.S. Pat. No. 3,458,664 teach conventional systems which exemplify many of the structural items employed according to the present invention. Reference is made to these patents as illustrating the various elements useful in the context of the present invention.

SUMMARY OF THE INVENTION

1. Purposes of the Invention

It is an objective of the present invention to provide a method for giving access to transmission channels of a communication system of the kind initially mentioned such that the utilization of a duplex transmission channel is increased.

It is a further objective of the invention to avoid scrambling of access attempts transmitted by different subscriber stations to a central base station at about the same point in time.

It is another objective of the present invention to provide a communication system where the central base station coordinates two way transmission to the subscriber station to the maximum extent.

These and other objectives and advantages of the present invention will become evident from the description which follows.

2. Brief Description of the Invention

Some of the terms employed in the context of the present invention are explained as follows:

A transmission channel includes all the transmission facilities between central base station and subscriber station.

A duplex transmission is a transmission in two directions between a central base station and a subscriber station, which includes a pair of radio channels. The distance between emitter and receiver frequencies of the duplex channel can be for example 10 MHz. For example 222 radio frequency channels with a channel grid of 20 kHz can be in an upper band, which is in the direction from the central base station to the subscriber stations and can have frequencies from 461.3 to 465.74 MHz. The lower band directed from mobile subscriber station to central base station can have frequencies from about 451.3 to 455.74n MHz. An example for such a transmission system is the grid C450 of Siemens Corporation, which is described in Electronics in the September 1985 issue on page 26. The organizing channel of the grid C450 includes a main frame with four subframes in the upper band having a time duration of 2.4 seconds. The main frame in the upper band is time shifted by 150 milliseconds versus the main frame of the lower band. Each subframe includes eight time slots each having a length of 75 milliseconds. Each time slot allows for transmission of communications of a length of 150 bits. Such systems are further specified for example in British Pat. No. 1,562,964.

A central base station is a node of a transmission channel connected to a plurality of subscriber stations. A subscriber station is in general a mobile station, in particular, for example, an automobile telephone. These subscriber stations are independent since they have no direct connections to each other but are all connected to the central base station. A multiple access system in this context refers to a system where the subscriber stations are independent from each other in their access attempts.

An access signal is a signal which participates in initiation of communication between a subscriber station and central base station. Without an access signal, it is in general not posssible for a subscriber station to access the central office. An access signal is generally a sequence of bits or pulses that is coordinated to a specific subscriber station. The bits can represent, for example, numerals or letters. The access signal can be composed of sections of information relating to the identification of a called station such as for example country code, area code, city code and the like.

A short access signal is a signal of similar nature to an access signal, which, however, is at least about 10 percent lower in the number of bits or pulses employed to transmit the signal and in general will be more than about 50 percent lower in the number of bits or pulses. A short access signal is a first step by a subscriber station in initiating an information exchange. An access signal or access request signal as employed in the context of the present invention in contrast requires always that a prior short access signal has been represented to by the central base station with a response signal.

An access attempt is the process by which one or more subscribers interact with the central base station of a radio communications system in order to enable initiation of subscriber information transfer. An access attempt starts according to the present invention with an access request formed by a short access signal. It continues with a response from the central base station and is completed with an access signal sent by the subscriber station. The access attempt can be denied by the central base station either after the short access signal or after the access signal is received. This situation can be compared with a time sharing computer system, where initially a user can log on if there are free ports of the server, but access is only granted after a proper password is received. However, in contrast to the computer system, the short access signal of the present invention does not fully identify the subscriber station making an access attempt, whereas computer systems generally receive full terminal identification with the initial log-on signal.

A time slot is a time interval which can be recognized and uniquely defined by central base station and/or subscriber ststion. The time slot can be provided for example by every 64th pulse from a clock pulse generator.

Time division switching is a system where various connections share a common path, but are separated in time. This is accomplished and employed in accordance with the present invention by permitting the various subscribers to use the common path to the central base station in sequence for a short period of time.

A fixed delay refers to a communication where an emission is performed after a certain time delay of, for example, three milliseconds.

Blocking means denying access to the communication system. Time can be subdivided in this context into permitted and blocked time intervals. In the context of a radio telephone system, a mobile station must be prevented from starting a transmission while an previously accessed mobile subscriber station is communicating with the central base station. Otherwise the two signals would overlap and in general prevent interference free reception.

A marking is one of two significant conditions of modulation relating to signal level or signal condition.

A transceiver includes elements suited for emitting a signal and elements for receiving a signal, where these elements can coincide. It is provided usually in a common housing and employs common circuit components.

The present invention provides a method for accessing of transmission channels in a communication system with at least a duplex transmission channel, at least one central base station and a plurality of independent subscriber stations. A short access signal originates at a subscriber station for engaging a duplex transmission channel for initiating a call from the subscriber station. The duplex transmission channel serves for information exchange between the central base station and the plurality of subscriber stations. The subscriber station is equipped with a first control device that is connected to a first transceiver set disposed in the subscriber station. During access onto the duplex transmission channel, the first control device employs a control signal to induce the transceiver part to emit a short access signal to the central base station via the duplex transmission channel. The short access signal is received in a second transceiver disposed in the central base station where it is fed to a second control device also disposed in the central base station. The transceiver of the central base station is actuated by the second control section to emit a response signal via the transmission channel and responds to the received short access signal by sending a request for a complete access signal to the subscriber station characterized by the short access signal, thereby initiating an information transmission from and to the subscriber station. Each subscriber station can access the duplex transmission channel according to a multiple access method.

The short access signal and the access signal can be stored in a first memory storage element disposed in the subscriber station and connected to the first control device, and they also can be stored in a second memory storage element disposed in the central base station and connected to the second control device. The short access signal received in the central base station can be compared, in a comparison circuit connected to the control circuit and to the transceiver, with a short access signal entered via the control device into the second memory and the result of the comparison can be communicated in the response signal as a characteristic of the subscriber station being responded to.

The point in time of the reception of a short access signal can be determined with a time measuring device connected to the second control device and can then be communicated as a characteristic of the subscriber station in the response signal emitted by the central base station to the subscriber station.

The received signal quality of the short access signal can be determined in a measurement section connected to the transceiver and the second control device, and, depending on the received signal quality, a request for complete identification can be emitted by the central base station.

In the second control device, a delay of each information transfer can be individually set in the direction to the central base station versus an information transmission in the direction to the subscriber stations. A corresponding control signal can be generated in the second control device, and can be transmitted via the second transceiver and the duplex transmission channel to the subscriber stations via the first transceiver and via the first control device. An information transmission in the direction to the central base station can be delayed with a delay circuit disposed in the subscriber station and connected to the first transceiver and to the first control device to obtain a time delay relative to the time of the information transmission in the direction to the subscriber station.

The duplex transmission channel can be subdivided into time intervals permitting or blocking free access by the control device of the central base station. Marking signals, provided by a marking device connected to the second control device and to the second transceiver, can be emitted in the direction toward the subscriber station, where the markings determine during which time intervals the subscriber stations can have access with short access signals onto the duplex transmission channel.

After reception of the response signal, emission of the access signal, as well as emission of additional information signals, can be limited to time intervals that are blocked from free access to the central base station. This can be achieved by connecting the first control device to a blocking circuit disposed in the subscriber station.

A signal coming from the second control device of the central base station and transmitted to the transceiver of the subscriber station can inform the subscriber station of a transmission channel blocked for free access but available to the subscriber station after its reception of the response signal both for emitting of the complete access signal by the subscriber station as well as for further information transmission.

The subscriber station can select, with a time presetting circuit and according to a defined algorithm, the exact point in time within a time interval permitting access for starting the emission of a short access signal to initiate an information transmission to the central base station.

The time intervals during which the subscriber stations may access the duplex transmission channel with a short access signal can be subdivided into call slots with a time control circuit disposed in the central base station and connected to the second control device, where the length of time of the call slots is an integral multiple of the time duration of a short access signal.

The response signal to a subscriber station, which has called with a short access signal, can be incorporated as a part of any transmission emitted by the central base station.

All the short access signals emitted by the subscriber stations can be of the same time duration.

The time intervals of the duplex transmission channel during which the subscriber stations can access with short access signals can be subdivided into a sequence of call slots in each transmission direction with the central base station.

Another aspect of the present invention provides a system for establishing communication transmission between subscriber stations served by a central base station. The system comprises a duplex transmission channel and a subscriber station emitting initially a short access signal for gaining access to the duplex transmission channel to initiate an information transmission to the central base station. Upon reception of the short access signal, which carries call request information amounting to less than a complete identification of the subscriber station, the central base station responds with a response signal that includes a request for a complete access signal of the subscriber station thereby initiating an information transmission from and to the subscriber station.

A first control device can be incorporated into the subscriber station for providing a fixed delay for each transmission in the direction towards the central base station versus the information transmission in the direction towards the subscriber stations.

A second control device can be incorporated into the central base station for intermittently blocking transmission modes and for subdividing the duplex transmission channel into time intervals permitted and time intervals blocked for free access by the subscriber stations.

Marking signals, which set times of allowed access to the duplex transmission channel for short access signals coming from the subscriber stations, can be emitted by a marking device disposed at the central base station.

Bit sequences of short access signals and of access signals can be recorded in a memory storage device and can be compared with incoming short access signals and access signals in a comparison circuit disposed in the central base station.

Preferably at least one system channel is provided which controls the establishment and interruption of connections, and a second voice channel is employed for transmitting the subscriber data message. Short access signals are employed to allow a subscriber initial access to the system channel.

An access signal call is shorter than a signal required for a complete identification. The complete identification signal is in general specified for transmission systems in so-called performance specifications which delineate, for example, the time interval of a complete information message.

The position in time of the access signal can be employed as a characteristic of the subscriber station by the center base station. Alternatively or in addition, the type of the access signal can be employed as a characteristic of the subscriber station by the central base station. The received signal quality of the access signal can be determined by the central base station and a request for complete identification can be emitted by the central base station depending on the received signal quality.

A determination of the signal quality can be accomplished in a variety of ways well known to those skilled in telecommunications equipment. For example, the book, Telecommunications and the Computer by James Martin, provides a general textbook-like introduction, which provides a general basis and reference providing some background. Furthermore, a determination of the signal to noise ratio is disclosed in Bell Systems Technical Journal, Volume 58, No. 1, January 1979, in particular pages 50, 162 and 171.

The time duration of a full identification can be less than about 100 microseconds and is preferably less than about 50 microseconds. The access signal can take a time of from about 5 to 80 percent of that of a complete identification or dialing number signal and preferably from about 10 to 30 percent.

Therefore, several ways are provided whereby the central base station after recepit of the access signal requests the concerned subscriber station to provide complete identification. For this purpose, both at the central base station as well as at the participating subscriber station, a known feature of the access signal has to be employed. This feature serves in the central base station for distinguishing between subscriber stations, which have in fact accessed during a certain time interval with an access signal and thus have shown that they desire communication transmission. The probability of access destructions, as well as the portion of the time during which the duplex transmission channel is blocked due to collisions, is decreased by shortening the duration of the access signal. Thus the utilization of the transmission channel for useful information transmission is substantially increased.

Employing the position in time or the kind of the access signal or both for partial subscriber station recognition can reduce the effects of simultaneously occurring access attempts or of interferences present on the transmission channel and imitated access attempts. The subscriber stations in each case can select one of several different access signals. The request for identification by the central base station can also indicate the kind of access signals employed by the subscriber station at the attempted access.

A further improvement of channel use results if the central base station emits a request for an access signal or identification only in those cases where a short access signal with sufficient reception quality was recognized. Reception quality can be determined with conventional equipment, for example, by measuring signal to niose ratio. This recognition and separation of access disturbances and imitations as well as of access attempts at low reception quality assures that no time intervals of the duplex transmission channel are kept open for access calls which would result in unsuccessful identifications and/or communications.

In addition, the utilization of the access-blocked time intervals (times during which the free access is blocked for other subscriber stations) is increased if the subscriber station asked for identification uses the time provided for this purpose in the best possible way. A subscriber station needs a certain reaction time, for example in order to evaluate the request for identification, before it is ready to emit an identification. A fixed delay period for each information transmission in the direction toward the central base station can be provided versus the information transmission in the direction toward the subscriber stations. Instead of using a fixed delay, the delay for each information transmission in the direction toward the central base station versus the transmission to the subscriber stations may be determined on a case by case basis by the central base station, and the delay period may be communicated to the subscriber stations.

Possible embodiments are set forth in the following for purposes of coordination in order to increase traffic throughput. The duplex transmission channel can be subdivided into time intervals either permitted or blocked for free access. The time intervals can be in the range from about 50 to 500 milliseconds. Those time intervals where free access is blocked, can be used for complete identification by the subscriber station after receiving the request for complete identification, as well as for additional information transmission. Markings can be emitted from the central base station to the subscriber stations, which determine during which time intervals the subscriber stations can access the duplex transmission channel with access signals. Accordingly, a transmission channel is employed both for access of the subscriber stations during time intervals permitting free access as well as for transmission of useful information during time intervals blocked for free access. The subscriber station can be informed of a transmission channel blocked from free access, which channel is employed both by the subscriber station after receipt of the request for complete identification for emitting the complete identification as well as for further information transmission. Therefore, a destruction of the use information caused by free access of other subscriber stations is completely avoided according to the method set forth.

The probability of mutal destruction of access signals is smaller if, during times permitting access, the accessing attempts occur as uniformly distributed as possible. The exact point in time with in a time interval permitting the access can be selected according to an algorithm or at random for starting the emission of a access signal of the subscriber station for the initiation of a connection starting at the subscriber station. Thus a subscriber station does not necessarily access immediately after receiving permission to access. For example, the exact point in time for emission of the short access signal call can be selected at random.

A simple realization of the course of processes in the subscriber station results if the duplex transmission channel is subdivided in forward and backward direction into time slots of equal length. In particular, the time intervals during which the subscriber stations can access with access signals can be subdivided into call slots, the time duration of which having a fixed ratio to the time duration of the access signals. Thus each time slot permissible for free access is subdivided into a number of short so-called call slots, where the time duration of a call slot corresponds to at least to the time duration of an access signal which is equal for all subscriber stations. Thus preferably all the access signals employed by the subscriber station are of the same time duration. Furthermore, the duplex channel is preferably subdivided in each transmission direction into a sequence of time slots.

The request for complete identification information to a subscriber station, which has called with an access signal, can be incorporated into a desired transmission emitted by the central base station. Thus there exists the possibility of providing a time interval in some or all transmissions of the central base station, in particular, those to a certain (previously identified) subscriber station. This time interval can be employed for an identification request to another subscriber station which has accessed with a short access signal. Instead of such an identification request in the time interval provided in a message, a marking, which provides either free access or blocking and thus determines during which time intervals the subscriber stations can access the duplex transmission channel, also can be entered by the central base station.

A error burst correcting code can be employed for the identification and for further transmission to correct an error burst generated during the transmission by emission of a short access signal call. Thereby a destruction of the useful information through free access of other subscriber stations is substantially avoided.

According to a further aspect of the invention, there is provided a system for establishing communication transmission between subscriber stations and a central base station which comprises a subscriber station emitting access signals via a duplex transmission channel to the central base stations for initiating information transmission from the subscriber station to the central base station receiving the access signals and responding with a request for complete access signal identification of the subscriber station thereby initiating an information transmission from and to the subscriber station.

A delay means can be provided for giving a fixed delay period for each transmission in the direction toward the central base station versus the information transmission in the direction of the subscriber stations. A blocking means can be provided for subdividing the duplex transmission channel into time intervals permissible and, respectively, blocked for free access from the subscriber stations.

The system of the present invention provides the advantage that the free access of a subscriber station to the duplex transmission channel is performed not with a complete identification, but with a substantially shorter signal. This access signal informs the central base station only that a transmission request exists coming from any subscriber station. The complete and unequivocal identification of the subscriber station can then be performed as well as possibly the transmission of other useful information at a later point in time at the same or at another transmission channel under coordination through the central base station such as, for example, the formation of waiting queues.

The novel features which are considered as characteristic of the invention are set forth in particular in the appended claims. The invention itself, however, both as to its system and its method of operation, together with additional objectives and advantages thereof, will be best understood from the following description of specific embodiments when read in connection with the accompanying drawing.

BRIEF DESCRIPTION OF THE DRAWING

In the accompanying drawing are shown two embodiments of the invention as applied to a radio telephone service.

DESCRIPTION OF INVENTION AND PREFERRED EMBODIMENTS

In accordance with the present invention, the stationary radio telephone stations (the central base stations) are spacially arranged according to a cell system. A number of duplex transmission channels also called radio channels are assigned to each stationary radio telephone station and thereby to each radio zone. At least one of the channels, the control channel, is employed for signalling of control commands for controlling system operation. Part of this system operation is, for example, the transmission of dialing information for the connection of lines from and to the mobile subscriber stations as well as identification messages of the mobile subscriber stations for providing information as to their reachability. The invention method and system applies to this control channel in order to be able to serve as many as possible mobile subscriber stations without the appropriation of additional control channels and in order to save radio channels and thus make a contribution to spectrum efficiency.

Figure 1:
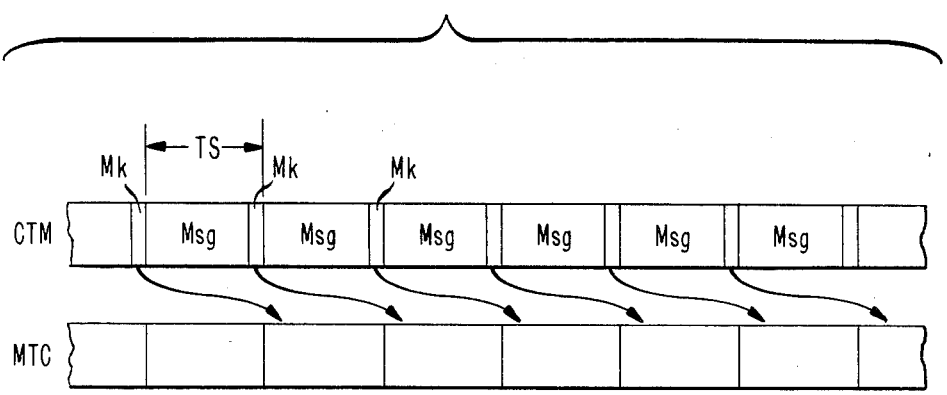
FIG. 1 is a view of a schematic diagram showing the organization of a transmission channel.

As is shown in FIG. 1, each control channel is subdivided in each transmission direction into a sequence of equal length time slots TS. To each time slot TS in backward direction CTM (from the central base station to the mobile subscriber station) is fixedly coordinated the time slot after the next in forward direction MTC (from the mobile subscriber station to the central base station). This is indicated in FIG. 1 by way of lines with arrows. A corresponding coordination between forward direction MTC and backward direction CTM is not provided. The central base station continuously emits messages Msg with contant time duration in the backward direction CTM which corresponds to a time slot TS. Each message Msg of the backward direction CTM comprises a marking Mk which informs about the intended use of the coordinated time slots TS in the forward direction MTC. The marking Mk can have one of the following three meanings:

Per=Permission for free access from mobile subscriber stations by means of access signals during the coordinated time slot.

Bl=Blocking of the coordinated time slot TS for free access.

XY=Request for complete identification by way of access signal during the coordinated time slot for that subscriber station which has accessed with the short access signal characterized by XY. This implies blockage to an access for all other mobile subscriber stations.

Each time slot TS permissible for free access is subdivided by fixing within the system into a certain number of, for example eight, call slots. In addition, a uniform duration of the access signal as a fixed system parameter is known to all mobile subscriber stations.

Figure 2:
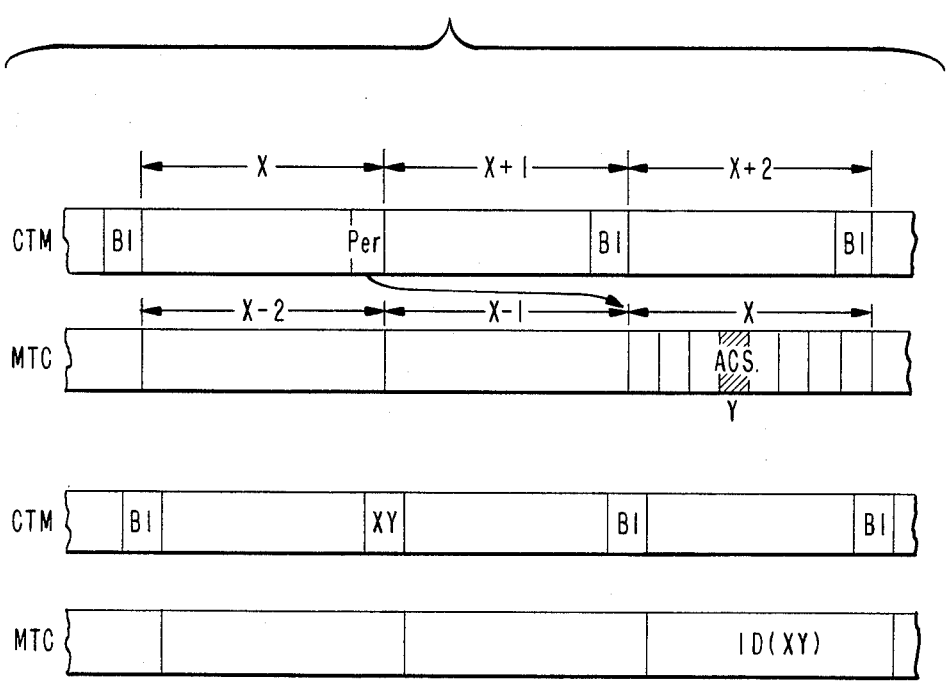
FIG. 2 is a view of a schematic diagram showing the course of an access onto the service channel

FIG. 2 shows the course of an access procedure onto the service channel. If a mobile subscriber station desires to access the control channel, it waits initially for a free access permission Per to the time slot TS in the forward direction MTC coordinated (as indicated by way of lines with arrow heads) to the free access permission. This time slot can be designated as X and is according to convention subdivided into, for example, eight, call slots. The mobile subscriber station selects at random one of these call slots designated in the following as Y and emits its access signal during that call slot Y. This comprises for example a bit pattern uniform for all mobile subscriber stations and therefore does not offer any possibility of distinction. The time position of the short access signal call characterized by the pair of values XY is known to both the mobile subscriber station and the central base station. The request for a complete identification access signal now comprises the indication of XY as a marking with the meaning already explained. The time slot fixedly coordinated to this marking is available solely to the invited mobile subscriber station in order to emit a message ID(XY) with its complete identification as well as the kind of dialogue desired with the stationary radio telephone station.

Figure 3A:
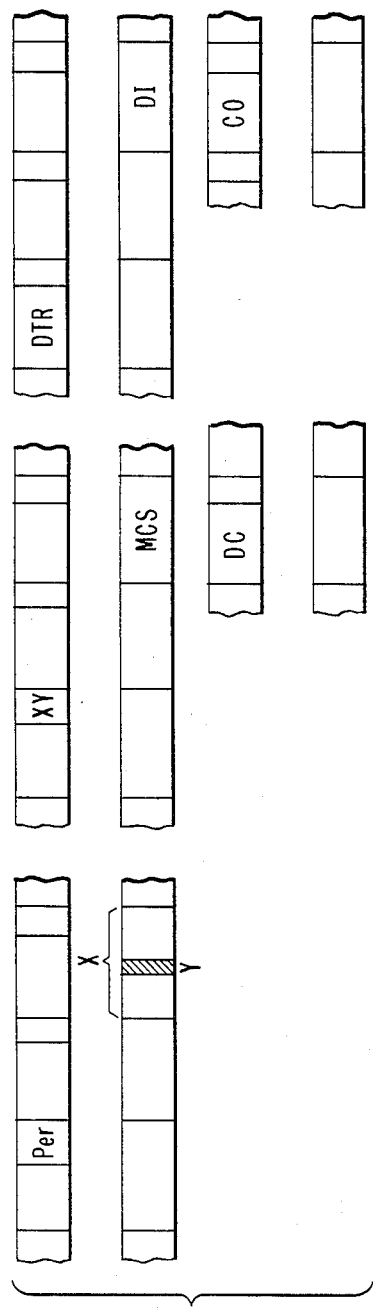
FIG. 3a is a view of a schematic diagram showing the dialogue between subscriber station and central base station at the initiation of a communication.
Figure 3B:
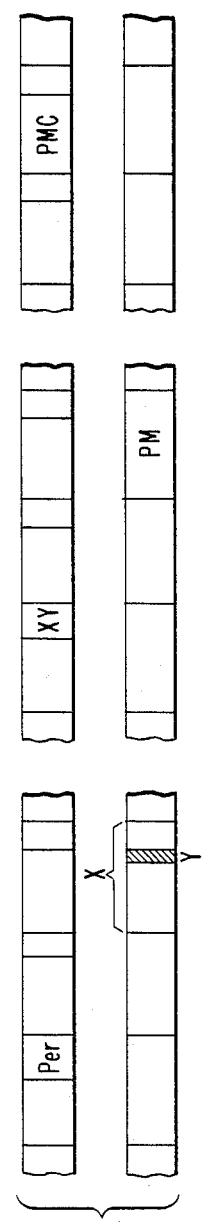
FIG. 3b is a view of a schematic diagram showing the dialogue between subscriber station and central base station used for indicating the presence of the subscriber station.
Figure 3C:
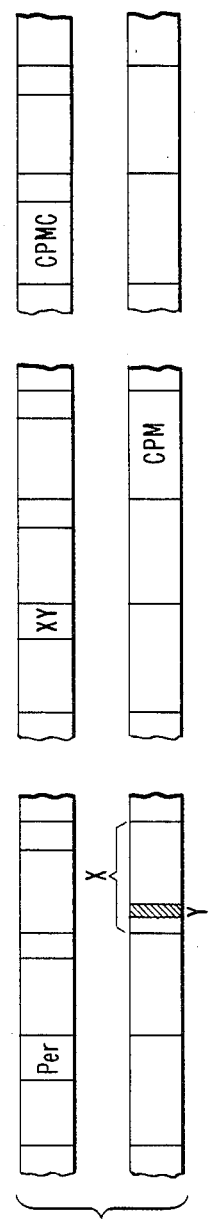
FIG. 3c is a view of a schematic diagram showing the dialogue between subscriber station and central base station upon change of position of the subscriber station.

Various kinds of dialogues are illustrated in FIGS. 3a, 3b, and 3c. For example, as kinds of dialogue there can be provided:

1. Setup of a call from a mobile subscriber station to a fixed subscriber of the telephone network (FIG. 3a),
2. Indication of presence upon readiness for operation of the mobile subscriber station (FIG. 3b), and
3. Change notice upon transition from one radio telephone zone into another ratio telephone zone (FIG. 3c).

Each of these dialogues comprises at least two messages and can be constructed as is described in the following.

1. Set up of Connection

After receiving the response identification request, which is designated as XY in FIG. 3a, the mobile subscriber statio emits in the forward direction MTC a mobile call set-up message MCS containing its complete identification as well as the indication that it is interested in establishing a voice link as an access signal. After a certain time, the central base station confirms the identifications and requests, by emitting the message DTR (ref. to FIG. 3a), the mobile subscriber station to transmit a dialing information. Thereupon, during the time slot after the next, the mobile subscriber station performs the transmission of a dialing information DI. The central base station confirms the dialing information with a dialing confirmation DC and starts providing the desired connection. If the called subscriber responds, the central base station emits a channel order CO which refers to a voice channel provided for the voice connection.

2. Indication of Presence

Upon switching on or during certain time intervals during the readiness for operation, the mobile subscriber station informs the central base station that it is accessible for calls in that radio zone. After performed access to the control channel and the request for complete identification, the mobile subscriber station emits a presence message PM, containing the complete identification. This message PM is confirmed by ths stationary central radio telephone station with a confirmation PMC, whereby the dialogue is terminated.

3. Change of Location

If a mobile subscriber station changes the radio zone, it has to inform that central base station, into, whose area the mobile subscriber station moves, about the change in radio zone such that the subscriber station remains within reach of the radio telephone service. The necessary dialogue corresponds to the presence communication (2.), where the messages PM are replaced by change messages CPM and the message PMC are replaced by a change message confirmation CPMC. The largest part of the time is taken up by the identification in the messages MCS, PM, CPM based on the large number of mobile subscriber stations to be admitted to the system. In comparison with this, the information required for the distinction of the dialogues is relatively minor. In addition to the recited messages DTR, DC, CO, PMC, CPMC, there exist in the backward direction CTM additional messages for other system functions. These system functions are not to be distinguished further here and are designated in the FIGS. 1 to 4 as Msg.

Figure 4:
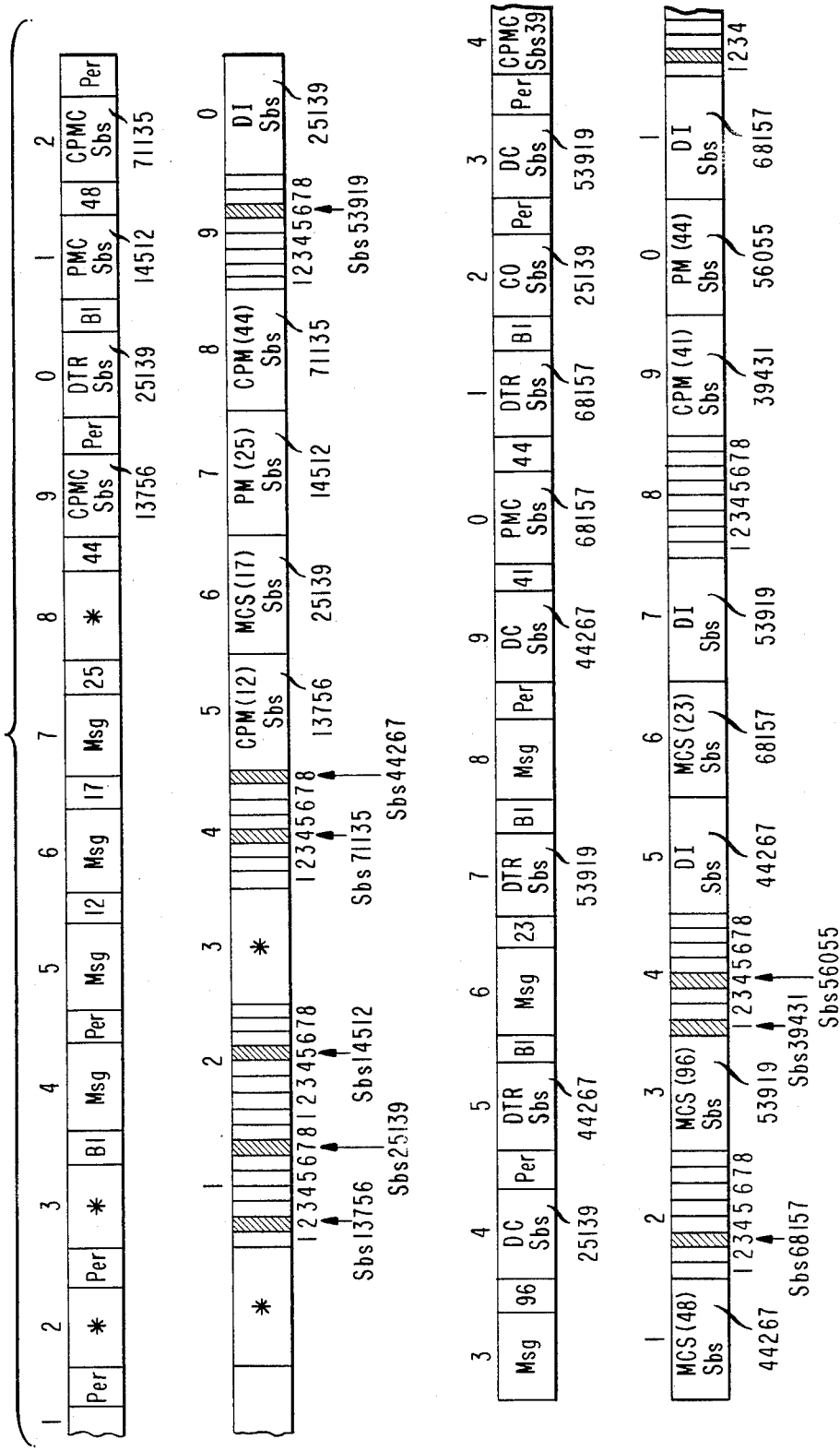
FIG. 4 is a view of a schematic diagram representing at time duration section of the control channel with various dialogues according to the invention.

A time section of the control channel with various dialogues is shown in FIG. 4. The various dialogues are performed with several mobile subscriber stations Sbs interlaced in time. The time slots represented with a * represent parts of dialogues, which were started before the beginning of the time section shown in FIG. 4. The numbering of the time slots is cyclically provided with the numbers 0 to 9. The request XY for complete identification therefore comprises two figures. The first figure X designates the number of the time slot, the second number Y designates the number of the call slot (in the time slot X) during which the access signal was emitted.

With respect to realization it can be more advantageous in contrast to this simplified representation to provide with the number X the number of the time slots passed since the emission of the access signal. It can be recognized from FIG. 4 that the time blocked for free access can be completely used for the transmission of use information messages, only a relatively small part of the capacity of the service channel has to be made available for free access, however, only a small part of the available call slots are occupied with access signals, from which only a small probability of destruction results, and therefore in total the invention method provides a high loading and use of the control channel combined with a low probability of access disturbances.

Figure 5:
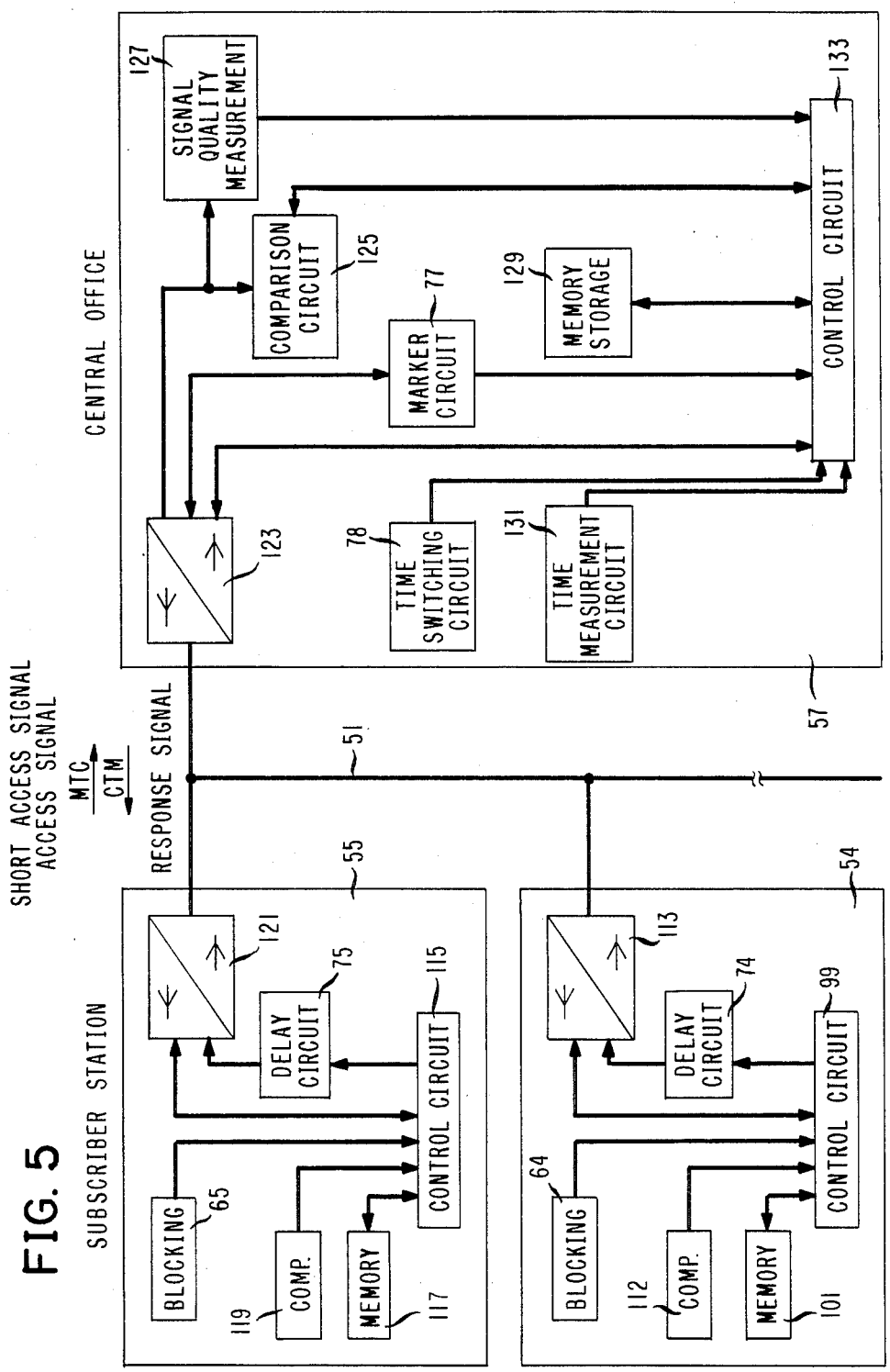
FIG. 5 is a view of a block circuit diagram of a communication transmission system for controlled access communications according to the present invention.

FIG. 5 furnishes a block circuit diagram of a communication transmission system with at least one central office 57, at least one duplex transmission channel 51 and a plurality of subscriber stations independent from each other. FIG. 5 illustrates two subscriber stations 54 and 55 and the central station 57.

A plurality of subscriber stations 54, 55 conduct information exchange with a central office 57 on the duplex transmission channel 51. In order to allow the subscriber stations, for example, subscriber station 54, to access the duplex transmission channel 51, a control device 99 is disposed in the subscriber station and is connected with an emitter and receiver section disposed in the subscriber station 54. If a subscriber station, for example, 54, intends to access the duplex transmission channel 51, then the control device 99 sends a control signal to the emitter and receiver station 113, causing it to transmit a short access signal via the duplex transmission channel 51. According to conventional methods as was described in detail in the introduction to the application, there is at this point an access signal (identification) sent to the central apparatus 57 via the duplex transmission channel, where the access signal characterizes the subscriber station, for example, 54. In order to avoid disturbances of the access, according to the invention, the subscriber station emits a short access signal before the emission of the actual complete access signal. The short access signal is received by a receiver and emitter device 123 disposed in the central office 57, and it is fed to a control device 133 also disposed in the central office. The control device 133 of the central office 57 thereupon requires the emitter and receiver device 123 to emit to the subscriber station, for example, 54, characterized by the short access signal successively a response and a request to provide the complete access signal via the duplex transmission channel 51.

The emitted access signal or, respectively, short access signal are stored in the subscriber station 54 and in the central office 57 in each case in a memory storage 101 or, respectively, 129. These memory storages 101 and 129 are connected to the control unit 99 or 133, respectively, which read the access signal and the short access signal in each case and feed them to the emitter and receiver device. The short access signals can all have the same time duration while they are employed by the subscriber station, for example, 54.

The central office 57 can capture the point in time of the reception of a short access signal with a time measurement device 131. The time measurement device 131 is connected to the control device 133. The time measurement device communicates the measured point in time as a part, employed for characterizing the signalling subscriber station 54, of the request signal to the subscriber station to provide the access signal.

In a further embodiment, the central office 57 is provided with a comparison circuit 125 which is connected to the control device 133 and to the emitter and receiver section 123. The received short access signal is compared with the short access signal in the memory storage, and the result of the comparison is fed to the control device 133 which communicates it via the emitter and receiver section 123 and the duplex transmission channel 51 in the response and request for providing an access signal as a characteristic of the subscriber station, for example, 54 contacted.

It can occur in the context of a radio transmission system that the quality of the reception of the message emitted by the subscriber station, for example, 54, is insufficient, for example, because the subscriber station 54 is in an electromagnetic shadow. The message is insufficient to be evaluated in the central office 57, and the central office determines the quality of the reception of the received short access signal with a measurement device 127 connected to the control device 133 and the emitter and receiver apparatus 123. Depending on the determined reception quality, the central office 57 emits a request to provide the access signal or does not issue such a call.

The duplex transmission channel 51 can be a so-called time multiplex transmission channel. For this purpose, the control device 133 in the central office 57 subdivides the duplex transmission channel 51 in each transmission direction H-R (short access signal, access signal) and R-R (response signal) into a sequence of time slots. The control device 133 determines individually a delay of each information transmission in the direction from the subscriber station to the central office versus the information transmission in the direction R-R from the central office to the subscriber station, for example 54. The control signal is fed to the subscriber station 54 via the emitter and receiver apparatus 113. The control device 99 of the subscriber station 54 evaluates the received control signal by providing a corresponding setting of the time interval with a delay circuit 74 disposed in the subscriber station 54 and connected with the control unit 99 as well as with the emitter and receiver apparatus 113.

The control device 133 of the central office subdivides the duplex transmission channel 51 into time intervals that are permitted for free access and into time intervals that are blocked for access. A marker device 77, which is connected to the control device 133 and the emitter and receiver section 123, sends marking signals in the direction from the central office to the subscriber station, such as 54. These markings fix in which time intervals the subscriber station, for example, 54, can access the duplex transmission channel 51 with short access signals. A subscriber station, for example, 54, after reception of the request to provide an access signal, transmits this access signal as well as further information only during time intervals which are blocked for free access. For this purpose, a blocking device circuit 64 is present in the subscriber station 54, which blocking circuit is connected to the control circuit 99 and which controls the point in time and the transmission in conjunction with the control device.

In order to initiate a connection from one of the subscriber stations, for example, 54, the subscriber station 54 dials with a time presetting circuit 112 the exact point in time when the transmission of a short access signal starts within a time span permitted for free access. This selection of the point in time can be arbitrary or can be performed according to an arbitrary predetermined algorithm. If each time span during which the subscriber station can access with the short access signal is subdivided into call slots by way of a time switching circuit 78 connected to the control device 133 and disposed in the central office 57, then the point in time of the start of the transmission of a short access signal is equal to the point in time of a call slot. The length in time of the duration of the short access signal is in fixed relation relative to the duration of the call slot. If the subscriber stations, for example, 54, employ short access signals with in each case the same time duration, then this time duration is advantageously equal to the time duration of a call slot.

The response or the request for emitting of an access signal can be emitted by the central office 57 as part of an arbitrary transmission in order to address a subscriber station, for example, 54, that has called previously with a short access signal.

The subscriber station 55 is constructed like the subscriber station 54. A control unit 115 is connected to a memory storage 117, a comparator circuit 119, a blocking circuit 65, a delay circuit 75 and an emitter and receiver circuit 121 connected to the delay circuit.

The invention method and system provide furthermore a series of advantages for the realization of control procedures in particular in the case of mobile subscriber stations.

It will be understood that each of the elements described above, or two or more together, may also find a useful application in other types of system configurations and telephone and communication switching procedures differing from the types described above.

While the invention has been illustrated and described as embodied in the context of a mobile radio telephone communication system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for accessing of transmission channels in a communication system with at least a central base station, at least a duplex transmission channel and a plurality of independent subscriber stations where the independent subscriber stations can access the duplex transmission channel comprising
originating at a subscriber station a bit sequence representing a short access code carrying cell request information amounting to less than a complete identification of the subscriber station, engaging a duplex transmission channel for initiating an information transmission from the subscriber station, where the duplex transmission channel serves for information exchange between the central base station and a plurality of subscriber stations, where the subscriber station includes a first control device which is connected to a first transceiver set disposed in the subscriber station, where the first control device employs a control signal to induce the transceiver part during access onto the duplex transmission channel to emit a bit sequence representing a short access code to the central base station via the duplex transmission channel;
receiving the bit sequence representing a short access code in a second transceiver part of the central base station;
feeding the bit sequence representing a short access code to a second control device disposed in the central base station;
actuating the second transceiver part of the central base station by the second control section to emit a response signal via the transmission channel for responding to the received bit sequence representing a short access code with a request for a complete access signal to a subscriber station characterized by such bit sequence representing a short access code thereby accepting initiation of an information transmission from and to the subscriber station.

2. The method for accessing of transmission channels according to claim 1 further comprising
storing the bit sequence representing a short access code and the access signal in a first memory storage element disposed in the subscriber station and connected to the first control device; and
storing the bit sequence representing a short access code and the access signal in a second memory storage element disposed in the central base station and connected to the second control device.

3. The method for accessing of transmission channels according to claim 2 further comprising
comparing the received bit sequence representing a short access code with a bit sequence representing a short access code entered via the control device into the second memory in a comparison circuit connected to the control circuit and to the transceiver; and
communicating the result of the comparing in the response signal as a characteristic of the subscriber station responded to.

4. The method for accessing of transmission channels according to claim 1 further comprising
determining the point in time of the reception of a bit sequence representing a short access code with a time measuring device connected to the second control device; and
communicating the position in time of the bit sequence representing a short access code as a characteristic of the subscriber station in the response signal emitted by the central base station for the subscriber station.

5. The method for accessing of transmission channels according to claim 1 further comprising
determining the received signal quality of the bit sequence representing a short access code in a measurement section connected to the transceiver and the second control device; and
emitting a request for complete identification by the central base station depending on the received signal quality.

6. The method for accessing for transmission channels according to claim 1 further comprising
setting individually a delay of each information transfer in the direction to the central base station versus an information transmission in the direction to the subscriber stations in the second control device; generating a corresponding control signal in the second control device;

transmitting the control signal via the second transceiver and the duplex transmission channel to the subscriber stations via the first tranceiver and via the first control device; and delaying an information transmission in the direction to the central base station with a delay circuit, which is disposed in the subscriber station and which is connected to the first transceiver and to the first control device for obtaining a time delay relative to the time of the information transmission in the direction to the subscriber station.

7. The method for accessing of transmission channels according to claim 1 further comprising subdividing the duplex transmission channel into time intervals permitting or blocking free access with the second control device of the central base station;

emitting marking signals in the direction toward the subscriber station furnished by a marking device connected to the second control device and to the second transceiver, where the markings determine during which time intervals the subscriber stations can have access with a bit sequence representing a short access code onto the duplex transmission channel.

8. The method for accessing of transmission channels according to claim 1 further comprising limiting, with the first control device connected to a blocking circuit disposed in the subscriber station, the emission of the access signal after reception of the response signal as well as of additional information signals to time intervals that are blocked for free access to the central base station.

9. The method for accessing of transmission channels according to claim 1 further comprising informing the subscriber station of a transmission channel blocked except for free access with a signal coming from the second control device of the central base station and transmitted by the first transceiver station, which channel is available after reception of the response signal by the subscriber station both for emitting of the complete access signal by the subscriber station as well as for further information transmission.

10. The method of accessing of transmission channels according to claim 1 further comprising selecting by the subscriber station, with a time presetting circuit, according to a defined algorithm the exact point in time within a time interval permitting access for starting the emission of a bit sequence representing a short access code in order to initiate an information transmission to the central base station.

11. The method for accessing of transmission channels according to claim 1 further comprising subdividing the time intervals during which the subscriber stations may access the duplex transmission channel with a bit sequence representing a short access code into call slots with a time control circuit disposed in the central base station and connected to the second control device, where the length of time of the call slots is an integral multiple of the time duration of a bit sequence representing a short access code.

12. The method for accessing of transmission channels according to claim 1 further comprising incorporating the response signal to a subscriber station, which has called with a bit sequence representing a short access code, as a part of any transmission emitted by the central base station.

13. The method for accessing of transmission channels according to claim 1 further comprising providing all the bit sequences representing a short access code emitted by the subscriber stations to have the same time duration.

14. The method for accessing of transmission channels according to claim 13 further comprising subdividing the time intervals of the duplex transmission channel during which the subscriber stations can access with bit sequences representing a short access code into a sequence of call slots in each transmission direction with the central base station.

15. A system for establishing communication transmission between subscriber stations served by a central base station comprising a duplex transmission channel;

a subscriber station emitting initially a bit sequence representing a short access code for gaining access to transmission via the duplex transmission channel, where the bit sequence representing a short access code carries call request information amounting to less than a complete identification of the subscriber station, to the central base station for initiating an information transmission of the subscriber station via the duplex transmission channel;

the central base station receiving the bit sequence representing a short access code and responding with a response signal including a request for a complete access signal of the subscriber station and thereby initiating an information transmission from and to the subscriber station.

16. The system for establishing communication transmission according to claim 15 further comprising a first control device incorporated into the subscriber station for providing a fixed delay for each transmission in the direction towards the central base station versus the information transmission in the direction towards the subscriber stations.

17. The system for establishing communication transmission according to claim 15 further comprising a second control device for intermittantly blocking transmission modes and for subdividing the duplex transmission channel into time intervals permitted and time intervals blocked for free access by the subscriber stations.

18. The system for establishing communication transmission according to claim 15 further comprising a marking device disposed at the central base station for emitting marking signals setting times with allowed access to the duplex transmission channel of bit sequences representing a short access code coming from the subscriber stations.

19. The system for establishing communication transmission according to claim 15 further comprising a memory storage device for recording bit sequences of short access codes and of access signals.

20. The system of establishing communication transmission according to claim 19 further comprising a comparison circuit disposed in the central base station for comparing incoming bit sequences representing a short access code and access signals with bit sequences representing a short access code and access signals stored in the memory storage.

* * * * *